United States Patent
Tarry (10) Patent No.: US 6,881,067 B2
(45) Date of Patent: Apr. 19, 2005

(54) VIDEO INSTRUCTIONAL SYSTEM AND METHOD FOR TEACHING MOTOR SKILLS

(75) Inventor: Robin Tarry, Stamford, CT (US)

(73) Assignee: Personal Pro, LLC, Greenwich, CT (US)

( * ) Notice: Subject to any disclaimer, the term of this patent is extended or adjusted under 35 U.S.C. 154(b) by 0 days.

(21) Appl. No.: 10/166,074

(22) Filed: Jun. 11, 2002

(65) Prior Publication Data

US 2002/0155417 A1 Oct. 24, 2002

Related U.S. Application Data

(63) Continuation of application No. 09/225,574, filed on Jan. 5, 1999.

(51) Int. Cl.[7] .............................................. G09B 19/00
(52) U.S. Cl. ...................................................... 434/247
(58) Field of Search ................................ 434/247, 252, 434/29, 30, 38, 43, 61, 62, 65, 66, 69, 255, 257; 463/1, 30, 43

(56) References Cited

U.S. PATENT DOCUMENTS

| | | | | |
|---|---|---|---|---|
| 3,408,750 A | * | 11/1968 | McCollough | 434/252 |
| 4,267,728 A | * | 5/1981 | Manley et al. | 73/172 |
| 4,657,250 A | * | 4/1987 | Newland et al. | 473/432 |
| 4,740,838 A | * | 4/1988 | Mase et al. | 348/148 |
| 4,814,896 A | * | 3/1989 | Heitzman et al. | 386/95 |
| 4,891,748 A | * | 1/1990 | Mann | 463/1 |
| 5,184,295 A | | 2/1993 | Mann | |
| 5,249,967 A | | 10/1993 | O'Leary et al. | |
| 5,269,687 A | * | 12/1993 | Mott et al. | 434/69 |
| 5,616,030 A | * | 4/1997 | Watson | 434/38 |
| 5,647,747 A | * | 7/1997 | Macri et al. | 434/247 |
| 5,697,791 A | | 12/1997 | Nashner et al. | |
| 5,781,437 A | * | 7/1998 | Wiemer et al. | 701/2 |
| 5,823,786 A | | 10/1998 | Easterbrook | |
| 5,823,878 A | * | 10/1998 | Welch | 463/43 |
| 5,868,578 A | * | 2/1999 | Baum | 434/247 |
| 5,984,684 A | * | 11/1999 | Brostedt et al. | 434/252 |
| 6,033,228 A | | 3/2000 | Ladin | |

FOREIGN PATENT DOCUMENTS

| | | | | |
|---|---|---|---|---|
| WO | WO91/03904 | * | 3/1991 | H04N/5/262 |
| WO | WO 93/00970 | | 1/1993 | |
| WO | WO 98/25250 | | 6/1998 | |

OTHER PUBLICATIONS

Kruegle, H., "Point of Sale Monitoring Downsizes for Small Venues", Security vol. 3, No. 5, p. 27, May 1993.*
Hiroshi et al, "Iterative Design of Seamless Collaboration Media", Communications of the ACM v. 37, p. 83–97, Aug. 1994.*
Little and Gibbon, "Management of Time–Dependent Multimedia Data", SPIE vol. 1785 Enabling Technologies for High Bandwidth Applications, 1992.*
Shimoda, S. et al., "Electronic Studio Sets Controlled by a Computer", ACM 18th Annual Computer Science Conference, Washington, D.C., Feb. 1990, p. 439.

* cited by examiner

*Primary Examiner*—Kurt Fernstrom
(74) *Attorney, Agent, or Firm*—Finnegan, Henderson, Farabow, Garrett & Dunner, L.L.P.

(57) ABSTRACT

A real-time camera image of a student is displayed to the student while the student is performing a physical activity. The student can switch between seeing his natural field of view and the live video image by refocusing his eyes. Additionally, instructional information may be overlaid on the real-time video, thus enhancing the learning process.

3 Claims, 7 Drawing Sheets

FIG. 7

VIDEO INSTRUCTIONAL SYSTEM AND METHOD FOR TEACHING MOTOR SKILLS

REFERENCE TO RELATED APPLICATIONS

This application is a continuation of application Ser. No. 09/225,574 filed Jan. 5, 1999.

FIELD OF THE INVENTION

The present invention relates generally to video instruction, and more particularly, to a computer aided real-time local or remote video instructional system for teaching motor skills.

DESCRIPTION OF THE RELATED ART

Athletes commonly watch pre-recorded videos of themselves in order to improve performance. For example, a golfer may record his golf swing for later study in order to better understand mistakes made.

Certain conventional training systems attempt to integrate video feedback with the actual performance of the activity more closely. For example, U.S. Pat. No. 5,249,967, to O'Leary et al., discusses a golf training device in which video images are taken of a student during a golf swing and displayed on a monitor in front of the student with overlaid template images of a master golfer. The student, by moving his head and looking at the video monitors, may see the video of himself along with an idealized training image of the master. Thus, the student receives nearly instant feedback on the progress of his swing.

Although the O'Leary patent provides rapid feedback to the student, it requires the student has to move his head away from the natural position of the golf swing to see the instructional video, thereby disrupting the natural swing. This drawback becomes even more pronounced when applied to sports other than golf, such as dance, in which the student's body may be completely turned away from the display.

SUMMARY OF THE INVENTION

One system consistent with the present invention for displaying a real-time image of the user comprises an image projection device in a fixed position relative to a user's eyes; and a video control system coupled to the projection device and causing the image projection device to display a real-time representation of the user.

A method of teaching motor skills to a user consistent with the present invention includes recording a real-time representation of the user; and displaying to the user, from a fixed position relative to the user's eyes, the real-time representation.

Another system consistent with the present invention comprises a video mixer having first and second video input ports and a video output port and a computer. The computer includes: a processor, a memory coupled to the processor, an input port coupled to the processor, and an output port coupled to the processor and the first input port of the video mixer. Further, a a video camera transmits a video signal to the input port of the computer and the second input port of the video mixer; and a head-mounted display displays a video signal received from the output port of the video mixer.

Another method consistent with the present invention, of overlaying an instructional signal on a real-time signal representing a person performing a physical act, comprises the steps of: analyzing an image of the person; scaling a pre-stored instructional signal to correspond to physical dimensions of the image of the person as determined in the analyzing step; generating the real-time signal of the person performing the physical act; and combining the scaled instructional signal with the real-time signal to form a combined signal.

BRIEF DESCRIPTION OF DRAWINGS

The accompanying drawings, which are incorporated in and constitute a part of this specification, illustrate several embodiments consistent with this invention and, together with the description, help explain the principles of the invention. In the drawings.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

Systems and methods consistent with the present invention, as described herein, display a live image of a student to the student while the student is performing a physical activity. The student can easily switch between seeing his natural field of view and seeing the live video image of himself merely by refocusing his eyes. The student can therefore gain insight into improving the performance of the physical activity, such as a golf swing, during the physical activity.

Figure 1:
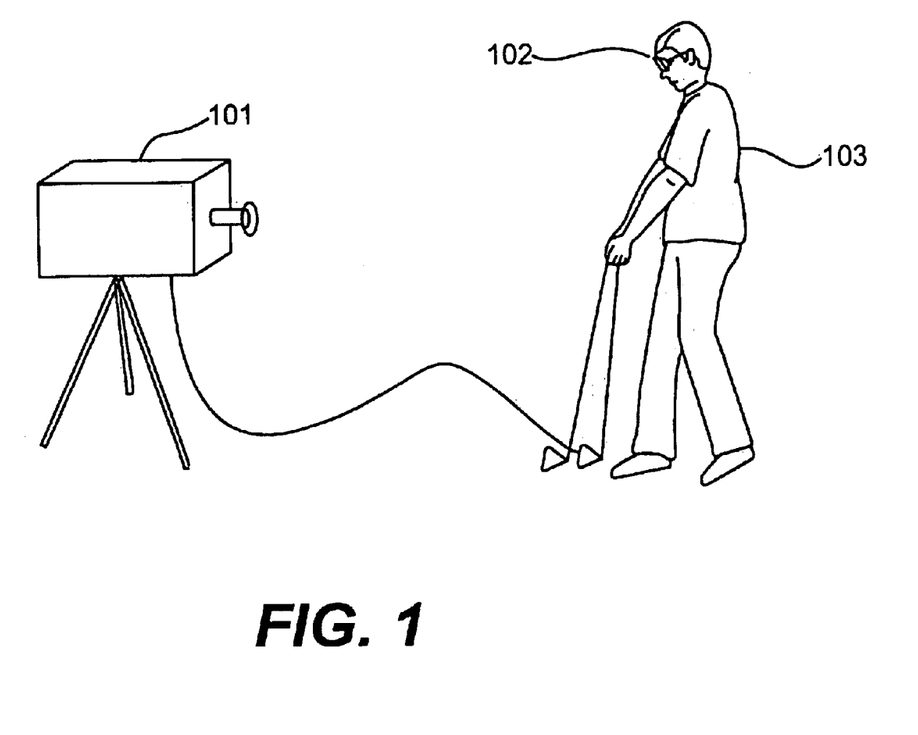
FIG. 1 is a diagram of an instructional system consistent with a first embodiment of the present invention.

FIG. 1 is a diagram illustrating one system consistent with the present invention. Video camera 101 records student 103. The video signal output from video camera 101 is transmitted, in real-time, to head-mounted display 102 worn by student 103. Head-mounted-display (HMD) 102 projects the video signal image seen by camera 101 onto the retinas of the student.

By changing eye focus, the student can alternate between the students natural view (i.e., the end of the golf club) and the view from camera 101. In this manner, the student can "see herself," in real-time, from the point of view of the camera, while continuing a natural golf swing. Accordingly, the student may correct mistakes or alter her swing based on the camera view as well as her natural view.

Head-mounted-display 102 is non-immersive, which means that the student can see the real-world outside HMD 102. A suitable HMD is, for example, "I-Glasses," made by i-O Display Systems LLC, of Menlo Park, Calif. HMDs other than the "I-Glasses" may, of course, also be used. Additionally, devices known as heads-up-displays, or any other device that projects an image in a fixed position relative to movement of the user's head, may alternatively be used.

Figure 2:
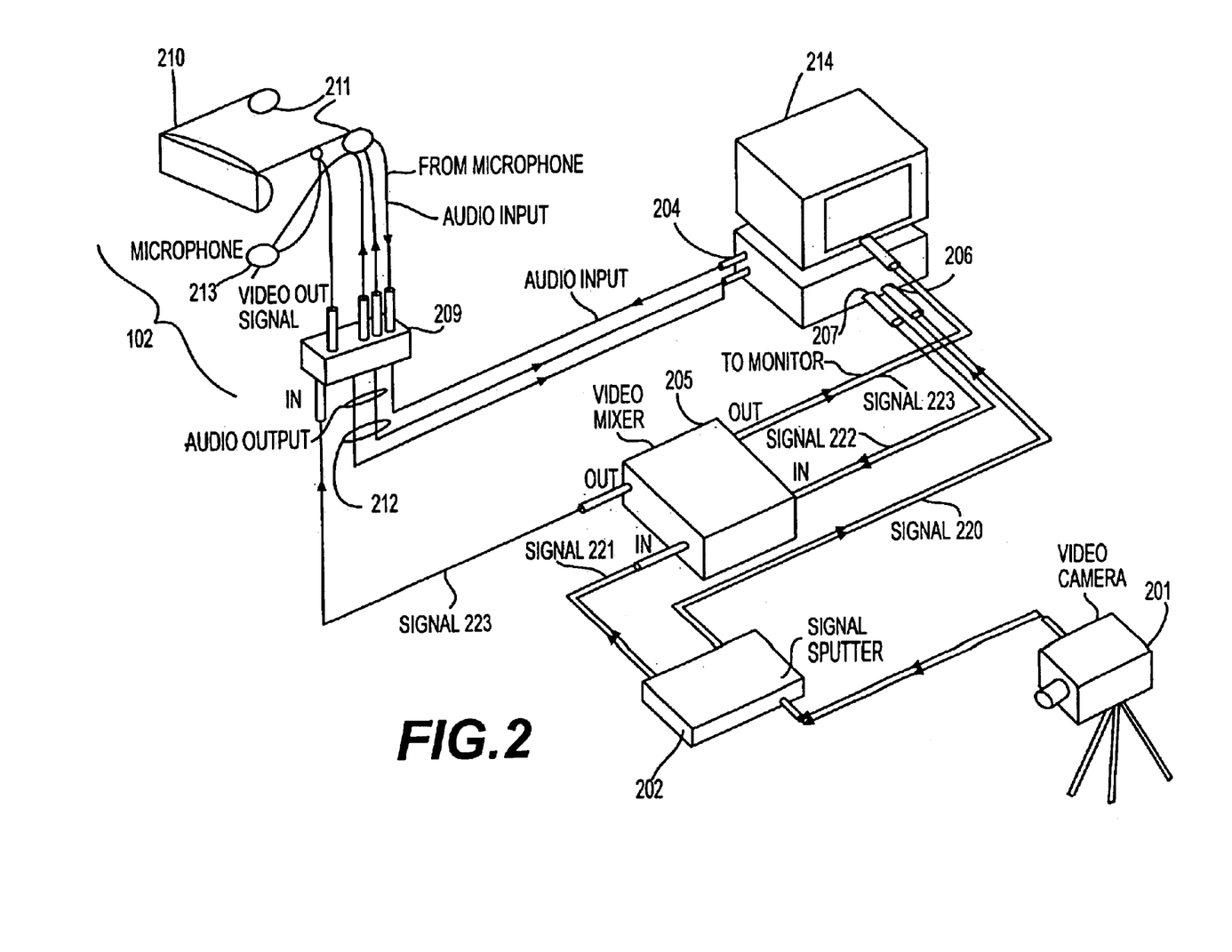
FIG. 2 is a diagram of an instructional system consistent with a second embodiment of the present invention.

FIG. 2 is a diagram of a system consistent with a second embodiment of the present invention. Video camera 201 generates a video signal of a student and transmits the signal to signal splitter 202, which splits the video signal into two identical output signals. Video mixer 205 receives one of the output signals, signal 221, and computer 204 receives the other output signal (signal 220) at computer input port 206. Computer 204 generates its own video output signal, signal 222, which is transmitted from output port 207 to a second input of video mixer 205.

Analog video input signal 220 may be digitized using a video capture board so computer 204 can process the input video signals as a sequence of digital frames. Digital frames from the computer may be converted back to an analog signal, such as signal 222, using a video conversion board. Alternatively, the video capture board and the video conversion board can be integrated as a single board.

As mentioned, video mixer 205 receives an input video signal from signal splitter 202 and computer 204. Video mixer 205 combines these two video signals to create one corresponding video signal 223. Video signal 223 is input to HMD 102, and optionally, to monitor 214 of computer 204. To combine the two video signal so that both can be distinctly seen at HMD 102 or monitor 214, the video signal from computer 204 may be created with a darker background than video signal 221. When overlaid on video signal 221, the darker pixels contrast with video signal 221, allowing the student to see either signal.

HMD 102 displays input video signal 223 to its wearer. HMD 102 includes a base portion 209 and a display portion 210. Both base portion 209 and display portion 210 may be worn by the student. Base portion 209 receives video signal 223, performs any necessary pre-processing on the video signal, such as splitting the signal into signals for each eye, and transmits the resultant signals to display portion 210. Display portion 210 displays the signals to the user as video by projecting the signals, via miniature projectors, onto the retinas of the student's eyes.

In addition to video, the student may receive audio through HMD 102 via earphones 211 and audio input port 212. As shown in FIG. 2, the audio input is generated by computer 204. Microphone 213 may be used to transmit audio to computer 204, which, as described below in more detail, may be used to control computer 204 or may be forwarded to a remote computer instructor.

Output video signal 222 from computer 204 is based on input signal 220 and includes instructional information that is to be superimposed at mixer 205 with the signal generated by camera 201. In this manner, computer 204 enhances the quality of the instructional signal provided to the student.

The generation of the instructional information by computer 204 will now be described in detail with reference to FIGS. 3-6.

Figure 3:
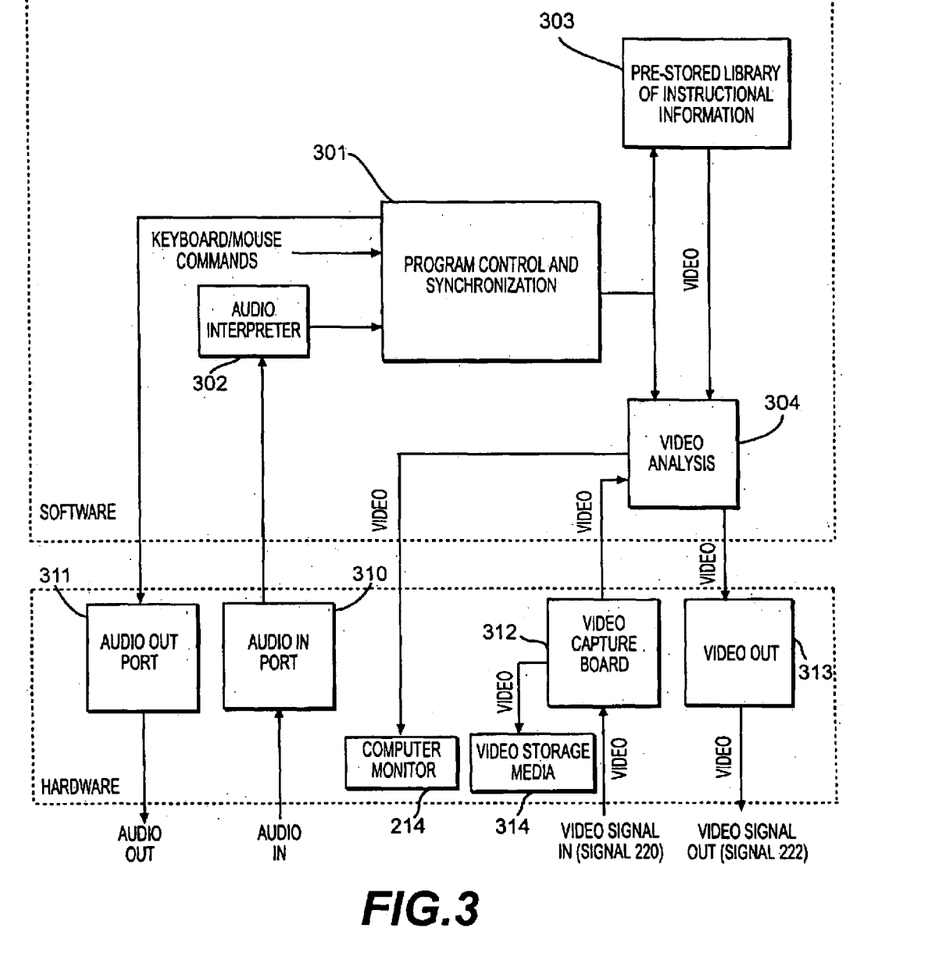
FIG. 3 is a conceptual block diagram illustrating interaction of hardware and software components in the second embodiment.

FIG. 3 is a conceptual block diagram illustrating interaction of hardware and software components of computer 204. Program control and synchronization section 301 coordinates the operation of software components 302–304 with hardware components 310–314 and 214. Control section 301 receives commands from the student or from a human instructor. The commands may be audio commands or commands entered through a more traditional computer interface device such as a keyboard, mouse, or touch screen. Audio commands are received through audio input port 310 and interpreted by audio command interpreter 302, which may be commercially available audio command interpretation software such as "Simply Speaking" from IBM corporation.

Audio output port 311 converts digital sound to analog sound, which is then heard by the student through earphones 211. Pre-generated video instructional information is stored in database 303. The instructional information may include, for example, a video outline of a model golf swing or video of a golf pro performing a model swing.

Video capture board 312 converts analog video input signals to digital video. The digital video signal may be encoded using a digital coding scheme such as MOV or AVI, and may be compressed using a codec such as MPEG1 or MPEG2. Video output board 313 converts digital video to analog video suitable for display on HMD 102.

Video analysis section 304 analyzes the digital video and transmits and forwards results of its analysis to video output port 313 or to computer monitor 214. Video analysis section 304 may process the input video images received from video capture board 312 in a number of ways, including: (a) highlighting a particular feature of the student (e.g., an extended arm); (b) extracting information from the video signal such as club speed, acceleration, angle, or deviation from a target location; or (c) transformation of club acceleration or speed into audio signals. Preferably, the analysis is done in real time so that output signal 222 is mixed at video mixer 205 with the corresponding images of video signal 221. Information extracted from the video signal, such as the speed of the club head, may be displayed to the student through HMD 102 or monitor 214. Alternatively, when transforming the club speed into audio, an indication of the club speed may be given to the student through earphones 211 while the student is looking at the golf ball.

In addition to processing video images from video capture board 312, analysis section 304 may also process the instructional signal from database 303. For example, when the instructional signal from database 303 is an outline of a human performing a model golf swing to be overlaid on the image of the student, analysis section 304 first analyzes the input video signal of the student to determine the appropriate size and positioning of the outline to be added to the real-time images of the student and then appropriately scales the overlay image. When the instructional signal from database 303 is a full video signal of a real-life human instructor placed in a corner of the real-time image, analysis section 303 may reduce the instructional signal to the appropriate size and place it in an appropriate location of the video out signal.

The input video signal may be stored in storage media 314 and later played back to the student, either on the computer monitor or at HMD 102. Video storage media 314 may be a magnetic storage disk or an optical storage disk. Analysis section 304 may additionally allow the student to perform various standard video playback functions such as slow motion playback, reverse playback, or freeze frame. The student may control playback using either standard computer input devices such as a pointing device or the keyboard, or through voice commands.

Figure 4:
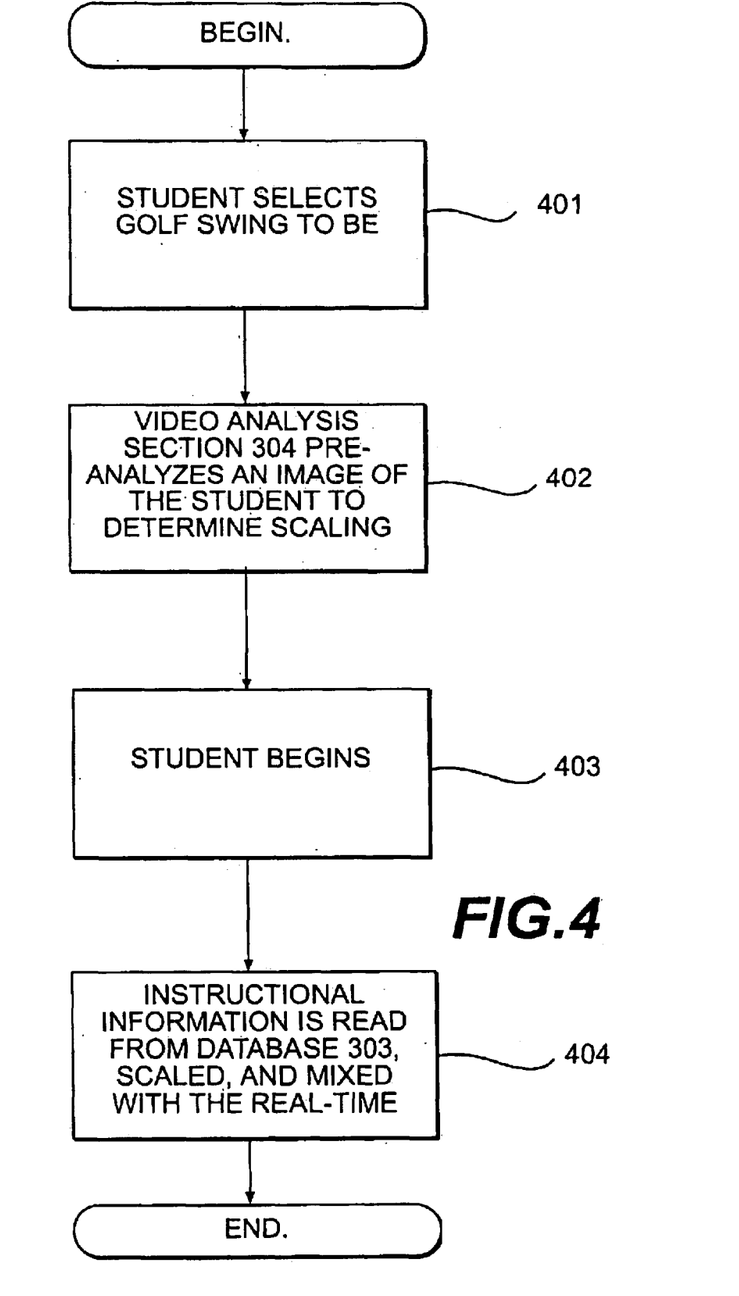
FIG. 4 is a flow chart illustrating generation of golf instructional information for overlay on the real-time image of the student.

FIG. 4 is a flow chart illustrating generation of golf instructional information for overlay on the real-time image of the student. The student selects the golf swing or part thereof to learn (step 401). Video analysis section 304 pre-analyzes an image of the student, taken by camera 201, and accordingly determines scaling and positional parameters for the instructional signal (step 402). The scaling and positional parameters are used by analysis section 304 during real-time playback to modify the instructional signal from database 303 so that it is correctly positioned in the video signal displayed to the student. When the student begins the golf swing (step 403), the instructional information is read from database 303, scaled by analysis section 304, and mixed with the real-time video signal supplied to HMD 102 (step 404). Alternatively, the scaling and reading from database 303 are performed before the student's swing and the results stored in memory.

Figure 5A:
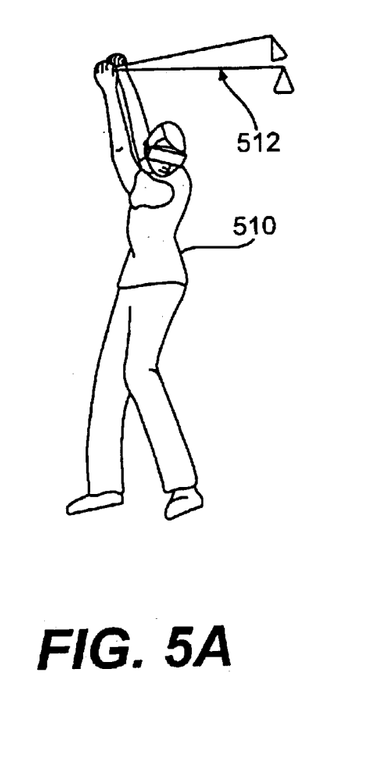
FIGS. 5A-5C are illustrations of exemplary image frames of a video signal after insertion of overlay information.
Figure 5B:
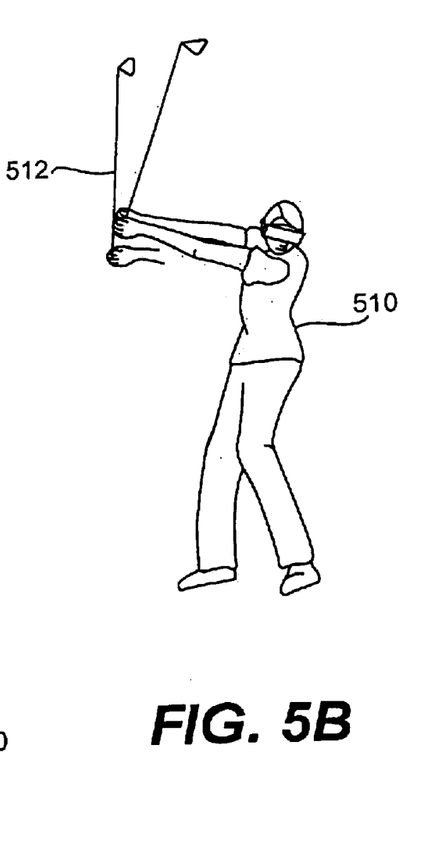
Figure 5C:
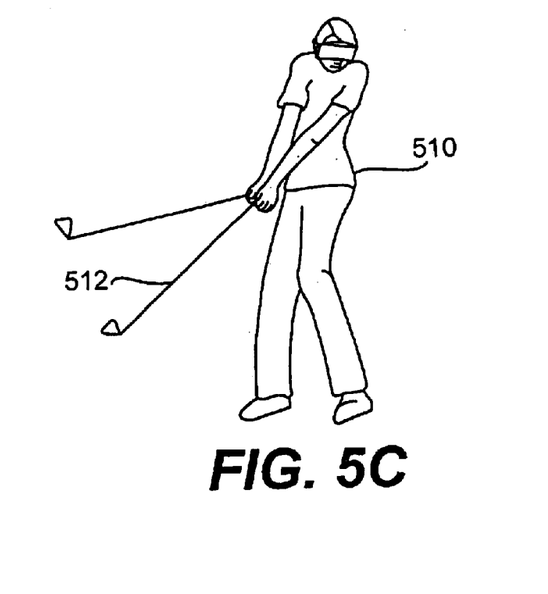

FIGS. 5A-5C are illustrations of exemplary image frames of video signal 223 after having overlay information inserted pursuant to the methods shown in FIG. 4. While it is difficult to get a sense of the video movement from the static representation shown in FIGS. 5A-5C, one should imagine the video flowing smoothly through frames 502, 504, and 506. As shown in frame 502, the actual image of student 510 swinging a golf club is superimposed with computer generation 512 of the golf club, which shows the ideal position of the golf club.

Figure 6:
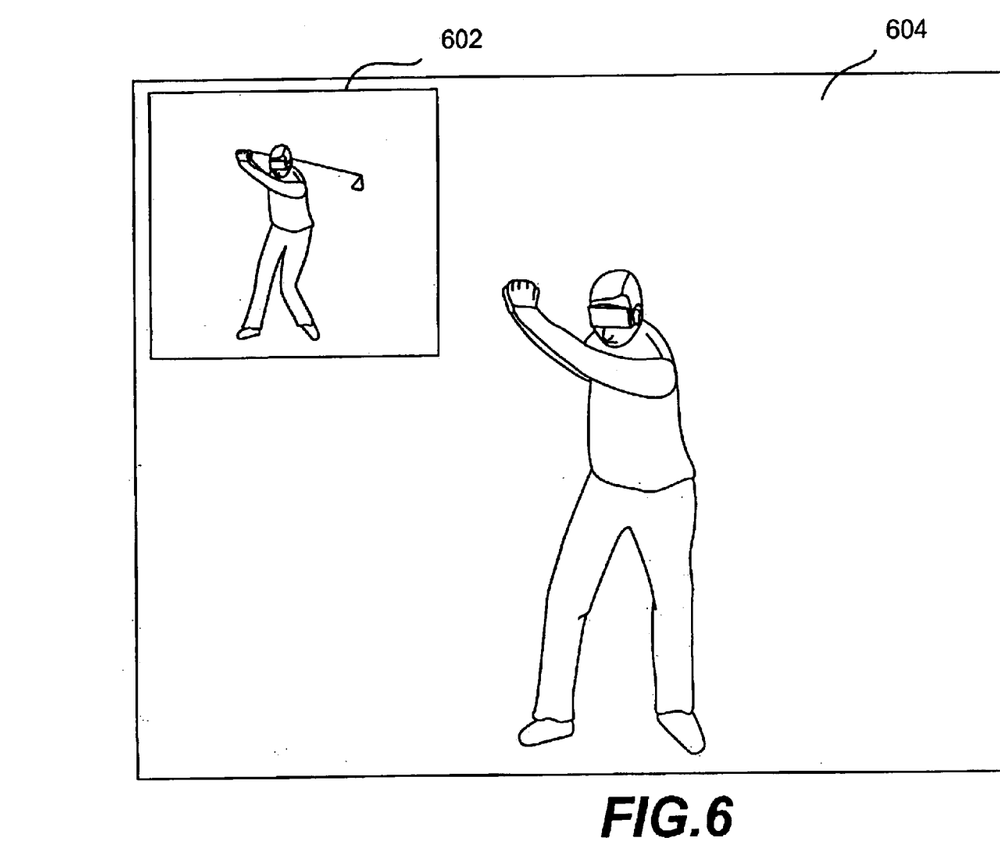
FIG. 6 is an illustration of an exemplary image frame of a video signal after insertion of an model instructional signal.

FIG. 6 is an illustration of video signal 223 consistent with another aspect of the instruction signal. Video area 602 is a video signal of a professional pro performing a model swing. Signal 602 is located in a corner of main video area 604, which is the real-time signal of the student. In this manner, the student can easily see both the camera view of himself and the professional.

The above-described user feedback signals generated by computer 204 are exemplary. Other feedback signals directed to a wide variety of training techniques may, of course, also be used. For example, feedback signals directed to the way in which the user addresses the ball or the user's stance may also be generated by computer 204.

Although not shown in the embodiment of FIGS. 1 and 2, cameras 101 and 201 may include an optional three-dimensional lens attached to its end. A suitable lens is the "Nu-View", made by 3-D Video Inc., of Santa Barbara, Calif. The three-dimensional lens separates the output video signal into left and right views, providing a stereoscopic three-dimensional video image. The left and right views may then be displayed to the left and right eyes of the student through HMD 102.

Figure 7:
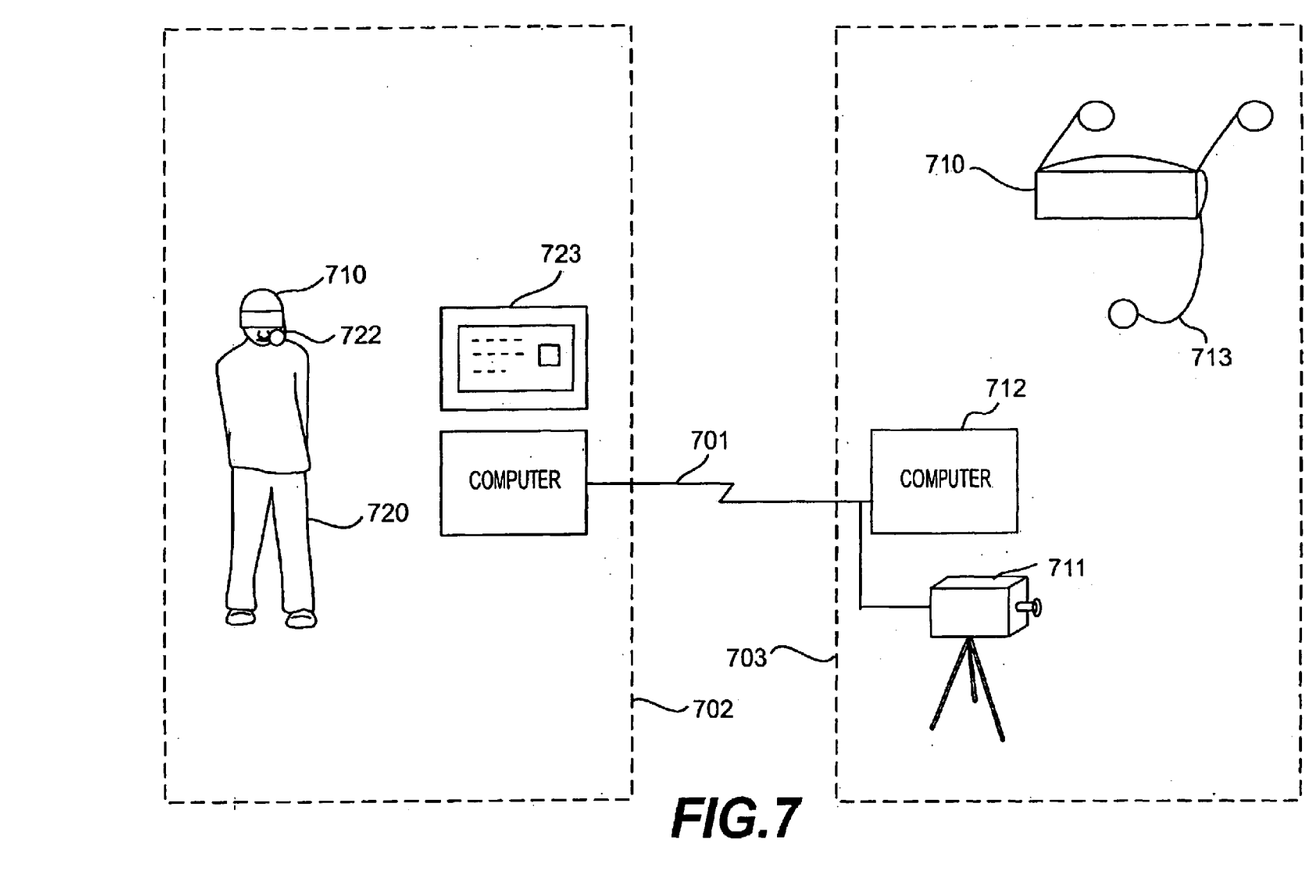
FIG. 7 is a diagram of a remote instructional system consistent with a third embodiment of the present invention.

The previously described instructional system may also be adapted for remote instruction in which an instructor is located at a distant location. A remote instructional system is illustrated in FIG. 7.

Network 701 couples instructor location 702 to student location 703. HMD 710, video camera 711, and computer 712 assist a student (not shown) in learning motor skill in the manner similar to that described in the previous embodiments. However, instead of or in addition to receiving feedback from software stored at computer 712, the student may also receive feedback from remote instructor location 702. The student may communicate with instructor 720 through microphone 713 or by entering information into computer 712. Video signals from camera 711 are forwarded to the instructor's computer, computer 721, by computer 712, where they may be viewed by the instructor. Computer 721 includes monitor 723 for displaying information.

Instructor 720, while viewing the student on the display of computer 721, may communicate with the student through textual or graphical comments entered at computer 721. For example, instructor 720 may draw visual annotations on selected images of the student's golf swing. The annotated images are then viewed by the student either through HMD 710 or the monitor of computer 712. Alternatively, the instructor may verbally instruct the student using microphone 722. The verbal instructions are input to computer 721, where they are digitized and transmitted to the student. Instructor 720 may also wear a head-mounted-display, allowing the instructor to see the student without having to look at display 723.

Although the above motor skill instructional systems were primarily described with reference to a golf instructional system, one of ordinary skill in the art will recognize that concepts consistent with the present invention are not limited to golf instruction, but can be applied to any physical activity or movement.

It will be apparent to those skilled in the art that various modifications and variations can be made to the present invention without departing from the scope or spirit of the invention. For example, although the instructional systems were described with an analog video camera and analog video signals, with appropriate components, such as a digital video camera, a digital HMD, and a digital bus such as the IEEE-1394 digital bus, the described instructional systems could be implemented as a completely digital system, thus eliminating the need to convert between digital and analog signals.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed:

1. A method for creating a real-time instructional video signal, comprising:

receiving a real-time signal associated with a user performing a physical activity;

analyzing, in real time, the received real-time signal;

generating real-time information based on the analysis;

combining the real-time signal and the real-time information into an instructional signal; and sending the instructional signal to a display.

2. The method of claim 1 wherein combining the real-time signal associated with the user and real-time information further comprises, overlaying the real-time information onto the real-time signal.

3. The method of claim 1, wherein generating real-time information further comprises, darkening visual elements of the real-time information so that the visual elements of the real-time information contrast visual elements of the real-time signal associated with the user.

* * * * *